(12) United States Patent
Obrecht et al.

(10) Patent No.: US 6,207,757 B1
(45) Date of Patent: Mar. 27, 2001

(54) RUBBER COMPOSITION, METHOD OF ADDING AND BLENDING THE COMPOSITION AND VEHICLE TIRE MADE FROM THE COMPOSITION

(75) Inventors: Werner Obrecht, Moers; Thomas Scholl, Bergisch Gladbach; Peter Wendling, Leverkusen; Michael Well, Vechelde, all of (DE); Victor Monroy, Charlotte, NC (US)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/365,227

(22) Filed: Jul. 30, 1999

(30) Foreign Application Priority Data

Aug. 1, 1998 (DE) ................................................ 198 34 804

(51) Int. Cl.[7] ................................. C08K 3/34; C08K 3/36
(52) U.S. Cl. .......................... 525/194; 525/346; 525/387; 556/413; 524/492; 524/495; 152/450
(58) Field of Search ..................................... 525/194, 346, 525/387; 556/413; 524/492, 495; 152/450

(56) References Cited

U.S. PATENT DOCUMENTS 4,226,953   10/1980   Coran et al. .

FOREIGN PATENT DOCUMENTS 2226917   7/1998   (CA) .
854170    7/1998   (EP) .
854171    7/1998   (EP) .

OTHER PUBLICATIONS

Database WPI XP–002122683.

*Primary Examiner*—Robert Dawson
*Assistant Examiner*—Kuo-Liang Peng
(74) *Attorney, Agent, or Firm*—Greenblum & Bernstein, P.L.C.

(57) ABSTRACT

A rubber composition which contains a rubber mixture that can be vulcanized with a vulcanizing agent, which includes at least one rubber component, at least one filler having nucleophilic groups, gel particles comprising a rubber, having a particle size between about $3 \times 10^{-9}$ and about $1 \times 10^{-6}$ m and a swelling index in toluene of about 1 to about 15 and whose surface has electrophilic centers, and a substance acting as a coupling agent between the filler having nucleophilic groups and the additional filler, the substance acting as a coupling agent having the following structure: $X—R_1—Si—(R_2)_3$, wherein X is a nucleophilic group, $R_1$ is an alkyl group having up to about 6 carbon atoms or a phenyl group, and $R_2$ may be the same as or different from each other and from $R_1$ and is an alkyl or alkoxy group having up to 6 carbon atoms and at least one of $R_2$ is an alkoxy group. The rubber composition has improved hysteresis behavior in the vulcanized state so that with the use of this rubber composition in tires, the rolling resistance is reduced and the wet slippage behavior is improved in relation to conventional rubber compositions. A method of adding and blending the rubber composition as well as a composition useful for tire treads and vehicle tires containing the composition are disclosed.

44 Claims, No Drawings

RUBBER COMPOSITION, METHOD OF ADDING AND BLENDING THE COMPOSITION AND VEHICLE TIRE MADE FROM THE COMPOSITION

CROSS-REFERENCE TO RELATED APPLICATIONS

The present application claims priority under 35 U.S.C. § 119 of German Patent Application No. 198 34 804.5, filed on Aug. 1, 1998, the disclosure of which is expressly incorporated by reference herein in its entirety.

Reference is made to U.S. application Ser. No. 09/305,225 filed Jul. 30, 1999, now U.S. Pat. No. 6,133,364, entitled "Rubber Composition, Method of Formulating the Composition and Vehicle Tire Made From the Composition", which is concurrently filed with the present application.

Reference is also made to U.S. application Ser. No. 09/365,226 filed Jul. 30, 1999, entitled "Rubber Composition, Method of Formulating and Blending the Same and Article and Tires Made Therefrom", which is concurrently filed with the present application.

1. Field of the Invention

The invention relates to a rubber composition that contains at least one rubber component and at least one initial filler whose surface has nucleophilic groups, more particularly hydroxyl groups, as well as additional customary additives. The composition is particularly useful in tire treads, and the invention relates to tires containing the inventive composition.

2. Discussion of Background Information

Rubber compositions are used for the manufacture of rubber products with an extremely wide variety of applications. Depending on the field of use, different demands are placed on the particular rubber composition. Thus, in addition to the rubber components, the rubber composition contains further constituents such as fillers, anti-aging agents, and vulcanizing agents, which materially affect the properties of the finished rubber product. For this reason, suitable systems of polymer and additional constituents must be prepared to obtain the appropriate properties of the rubber product. Fillers in a rubber composition are accorded great importance. Not only do they contribute to lowering the price of rubber compositions, their specific effects on the rubber are also exploited. For this reason, there has been no lack of experiments, e.g., to mix an extremely wide variety of fillers in the rubber composition. Carbon black and silicic acid, for example, are known as fillers. It has been observed that rubber products containing carbon black as filler, for example, possess adequate mechanical load capacity, but when these compositions are used in tire treads, the tires have the disadvantage that they have a high rolling resistance and poor wet skid behavior. An attempt has been made to solve this problem by mixing silicic acid into the tread composition; this in turn requires a filler activator for binding to the polymer. However, it has been observed that rubber products that contain silicic acid as filler and a conventional organosilane (e.g., bis-3-(triethoxysilylpropyl) tetrasulfide) as filler activator have an inadequate influence on the hysteresis behavior and the reinforcement of the rubber product for modern application areas.

Thus, current rubber compositions for the manufacture of vehicle tires (e.g., tire treads) are required that, in the vulcanized state, lend the tire even lower rolling resistance, resulting in reduced fuel consumption. At the same time, other characteristics, such as durability and wet skid behavior, should not be adversely affected, if possible.

SUMMARY OF THE INVENTION

Other exemplary embodiments and advantages of the present invention may be ascertained by reviewing the present disclosure.

The present invention provides for the preparation of rubber compositions that have improved hysteresis behavior in the vulcanized state so that when these rubber compositions are used, e.g., in tires, the rolling resistance is reduced. Also the present invention provides for an elastomer or rubber composition which can be better strengthened through the use of an appropriate filler system.

The invention further provides for a composition for use in tire treads having a rubber mixture that can be vulcanized with sulfur, which includes:

a) at least one rubber component, b) at least one filler having nucleophilic groups, c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers, d) a substance acting as a coupling agent between the filler having nucleophilic groups and the additional filler. The substance acting as the coupling agent has the following structure:

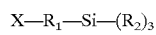

$$X\text{—}R_1\text{—}Si\text{—}(R_2)_3$$

wherein

X is a nucleophilic group, $R_1$ is an alkyl group having up to about 6 carbon atoms or a phenyl group, and $R_2$ may be the same as or different from each other and from $R_1$ and is an alkyl or alkoxy group having up to about 6 carbon atoms and at least one of $R_2$ is an alkoxy group.

X may be $NH_2$, $SH$, or $NHR_3$, wherein $R_3$ may be an alkyl group having up to about 3 carbon atoms or a phenyl group. $R_1$ and $R_2$ may be branched, unbranched or cyclic alkyls. The substance acting as a coupling agent may be one or both of aminopropyltriethoxysilane or 3-(2-aminoethylamino)-propyl-trimethoxysilane. The nucleophilic groups of the filler may be silanol groups. The filler with the silanol groups may be silica. The filler may further be carbon black having silanol groups located on its surface. The rubber component may be selected from natural rubber, synthetic polyisoprene, styrene butadiene, polybutadiene, or mixtures thereof. The composition may contain about 10 to about 110 phr gel and about 10 to about 110 phr silicic acid relative to 100 parts of total rubber material. The gel may be selected from the group selected from a polymer of butadiene with p-chloromethyl styrene, a polymer of styrene butadiene rubber modified with p-chloromethyl styrene, and a polymer of butadiene with methacrylic methylester, wherein each polymer has a swelling index in toluene between about 1 and about 15 and a particle size between about $3 \times 10^{-9}$ and about $1 \times 10^{-6}$ m. Preferably, the gel is styrene butadiene rubber modified with p-chloromethyl styrene with a swelling index in toluene between about 1 and about 15 and a particle size between about $3 \times 10^{-9}$ and about $1 \times 10^{-6}$ m.

The invention also provides for a vehicle tire having a tread formed of a composition which includes a rubber mixture that can be vulcanized with sulfur. The composition includes:

a) at least one rubber component, b) at least one filler having nucleophilic groups, c) as an additional filler, gel particles comprising a rubber, having a particle size between about $3\times10^{-9}$ and about $1\times10^{-6}$ m and a swelling index in toluene of about 1 to about 15 and whose surface has electrophilic centers, d) a substance acting as a coupling agent between the filler having nucleophilic groups and the additional filler. The substance acting as the coupling agent has the following structure:

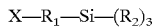

wherein

X may be a nucleophilic group, $R_1$ may be a branched, unbranched or cyclic alkyl group having up to about 6 carbon atoms or a phenyl group, and $R_2$ may be the same as or different from each other and from $R_1$ and may be a branched, unbranched or cyclic alkyl or alkoxy group having up to about 6 carbon atoms, and at least one of $R_2$ is an alkoxy group.

X may be $NH_2$, SH, or $NHR_3$, wherein $R_3$ may be an alkyl group having up to about 3 carbon atoms or a phenyl group. The substance acting as a coupling agent may be aminopropyltriethoxysilane or 3-(2-aminoethylamino)-propyl-trimethoxysilane. The nucleophilic groups of the filler may be silanol groups. The rubber component may be selected from natural rubber, synthetic polyisoprene, styrene butadiene, polybutadiene, or mixtures thereof and the gel may be selected from the group selected from a polymer of butadiene with p-chloromethyl styrene, a polymer of styrene butadiene rubber modified with p-chloromethyl styrene, and a polymer of butadiene with methacrylic methylester, wherein each polymer has a swelling index in toluene between about 1 and about 15 and a particle size between about $3\times10^{-9}$ and about $1\times10^{-6}$ m.

The invention also provides for a method of formulating a composition for use in tire treads, which includes: forming a mixture including a filler and at least one rubber component and mixing; then adding to the mixture gel particles including a rubber, having a particle size between about $3\times10^{-9}$ and about $1\times10^{-6}$ m and a swelling index in toluene of about 1 to about 15 and whose surface has electrophilic centers and mixing; then adding to the mixture at least one filler having nucleophilic groups and mixing; then adding to the mixture a substance acting as a coupling agent between the filler having nucleophilic groups and the additional filler and mixing thereby forming a base mixture to which vulcanizing constituents are added. There is nothing critical in the order of the steps of adding the various components to the rubber composition, i.e., the skilled worker may add the components in any order as desired. For example, the gel particles, the substance acting as a coupling agent or the filler having nucleophilic groups may be first added to the rubber component. The substance acting as a coupling agent has the following structure:

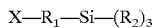

wherein

X may be a nucleophilic group, $R_1$ may be a branched, unbranched or cyclic alkyl group having up to about 6 carbon atoms or a phenyl group, and $R_2$ may be the same as or different from each other and from $R_1$ and may be a branched, unbranched or cyclic alkyl or alkoxy group having up to about 6 carbon atoms, and at least one of $R_2$ is an alkoxy group.

Additionally, in the method, X may be $NH_2$, SH, or $NHR_3$, wherein $R_3$ may be an alkyl group having up to about 3 carbon atoms or a phenyl group. The substance acting as a coupling agent may be one or both of aminopropyltriethoxysilane or 3-(2-aminoethylamino)-propyl-trimethoxysilane. The nucleophilic groups of the filler may be silanol groups, the rubber component may be selected from natural rubber, synthetic polyisoprene, styrene butadiene, polybutadiene, or mixtures thereof and the gel may be selected from the group selected from a polymer of butadiene with p-chloromethyl styrene, a polymer of styrene butadiene rubber modified with p-chloromethyl styrene, and a polymer of butadiene with methacrylic methylester, wherein each polymer has a swelling index in toluene between about 1 and about 15 and a particle size between about $3\times10^{-9}$ and about $1\times10^{-6}$ m.

The invention also provides for a composition for use in tire treads in which a rubber mixture contains a) as an additional filler a gel that consists essentially of a rubber, has a particle size between about $3\times10^{-9}$ and about $1\times10^{-6}$ m and a swelling index in toluene of about 1 to about 15, and whose surface has electrophilic centers, and also b) a substance acting as a coupling agent between the gel particles and the first filler and having the following structure;

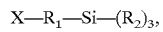

where

X may be a nucleophilic group, and more particularly $-NH_2$, $-SH$, or $-NHR_3$ with $R_3$ being an alkyl group with up to about 3 carbon atoms or phenyl group $R_1$ may be an alkyl group (branched or unbranched or cyclic) with a total of up to about 6 carbon atoms (such as $-CH_3$, $-C_2H_5$, $-C_6H_{10}$ (-cyclohexyl), -isobutyl)) or phenyl group;

$R_2$ may be the same as or different from each other and from $R_1$ and may be a branched, unbranched or cyclic alkyl or alkoxy group having up to about 6 carbon atoms, and at least one of $R_2$ is an alkoxy group.

The composition according to the present invention may contain, based on 100 parts by weight of the rubber component, the filler having nucleophilic groups in a range of from about 10 phr to about 110 phr, the gel particles having electophilic centers in a range of from about 10 phr to about 110 ph, and the substance acting as a coupling agent in a range of from about 10 mole % to about 100 mole % with respect to the molar amount of the electrophilic centers of the gel particles.

It is especially preferred that the composition according to the present invention contain based on 100 parts by weight of the rubber component, the filler having nucleophilic groups in a range of from about 15 phr to about 60 phr, the gel particles having electophilic centers in a range of from about 15 phr to about 60 phr, and the substance acting as a coupling agent in a range of from about 10 mole % to about 50 mole % with respect to the molar amount of the electrophilic centers of the gel particles.

It is most preferred that the composition according to the present invention contain based on 100 parts by weight of the rubber component, the filler having nucleophilic groups in a range of from about 20 phr to about 40 phr, the gel particles having electophilic centers in a range of from about 20 phr to about 40 phr, and the substance acting as a coupling agent in a range of from about 15 mole % to about 35 mole % with respect to the molar amount of the electrophilic centers of the gel particles.

When the rubber composition of this invention is used to make a tire tread, it may be used to constitute the tread.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to describe the present invention in more detail than is necessary for the fundamental understanding of the present invention, the description making apparent to those skilled in the art how the several forms of the present invention may be embodied in practice.

It has been observed that rubber compositions that include at least one filler whose surface has nucleophilic groups, more particularly hydroxyl groups, and at least one additional filler that is a gel and whose surface has electrophilic centers in combination with at least one of the coupling agents named, possess improved damping characteristics and at the same time excellent tensile modulus values in the vulcanized state. Such rubber compositions may be used especially for the manufacture of rubber articles subject to high dynamic loading so that their service life is extended. More particularly, when this rubber composition is used for treads of pneumatic tires for vehicles, the rolling resistance could additionally be reduced with essentially the same wet skid behavior.

The gel includes at least one rubber component (for example, NR, BR, SBR, NBR) and additional additives, such as anti-aging agents. Preferably, the gel includes at least one rubber component and additional additives, such as anti-aging agents.

The manufacture of the polymer matrix of the gel, on whose surface are located electrophilic centers, that is used in the rubber composition according to the invention can be accomplished in the following steps:

1. through copolymerization of at least two monomers, e.g., polymerization of butadiene with p-chloromethyl styrene.
2. retroactive functionalizing (e.g., by grafting) of a polymer, e.g., styrene butadiene copolymer is grafted onto the p-chloromethyl styrene.
3. retroactive modification of a polymer (e.g., by splitting of ester groups), e.g., polymerization of butadiene with methacrylic methylester and subsequent hydrolysis.

The production of the gels is carried out in the latex phase of the polymer. As used herein, latex that is at least pre-cross-linked by the addition of an additional cross-linking agent is called a gel. The production of gels is described below.

After a latex containing rubber is produced in accordance with the above steps 1 to 3, the latex may be cross-linked by the addition of a cross-linking agent such as a peroxide. An example of a peroxide is dicumyl peroxide. This may be carried out in an autoclave. Sufficient cross-linking agent is added such that the swelling index of the gel in toluene is adjusted to between about 1 and about 15, preferably between about 1 and about 10. It is also possible to provide the surface of the latex with electrophilic centers. This may occur after the setting of the swelling index during the production of the gel, for example, in accordance with the above-mentioned steps 2 or 3.

Furthermore, it is possible to add further additives, such as anti-aging agents, to the latex phase or to the gel. The gel is removed, filtered off, washed, and dried to constant weight. The gel obtained has a particle size from about 3 to about 1000 nm. This is determined by using the DIN 53 206 ultracentrifugation method. The centrifuge speed is 20,000 rpm. It is also possible to precipitate from a prepared master batch the pre-cross-linked or cross-linked latex (gel) together with non-cross-linked latex so that a separate step to isolate the gel can be eliminated.

The swelling index ($Q_i$) of the gels is calculated from the weight of the solvent-containing gel (after centrifugation at 20,000 rpm) and the weight of the dry gel:

$Q_i$=wet weight of the gel/dry weight of the gel.

To determine the swelling index, for example, 250 mg of gel are allowed to swell for 24 hours with agitation in 25 ml of toluene. The gel is then centrifuged (at 20,000 rpm) and weighed (wet weight), and subsequently dried at 70° C. to constant weight and weighed again (dry weight).

The surface of the gel may contain groups, such as halogens (preferably chlorine, bromine), —$NH_2$, —OH, etc., which produce a positive (electrophilic) center where a nucleophilic attack, i.e., a nucleophilic substitution, by X of the specified coupling agents may take place.

It is especially preferred that the gel is styrene butadiene rubber modified with p-chloromethyl styrene with a swelling index in toluene between about 1 and about 15 and a particle size between about $3 \times 10^{-9}$ and about $1 \times 10^{-6}$ m.

The filler having nucleophilic groups, especially hydroxyl groups, at least on its surface is preferred. An example of such a filler may be silicic acid or carbon black whose surface has silanol groups—and thus also hydroxyl groups—through, for example, treatment with silicic acid. The silicic acid used in the rubber mixture according to the invention is known in the art. Thus, silicic acid with a BET surface of about 145 to about 270 $m^2/g$ (ASTM D 5604), a CTAB number of about 120 to about 285 $m^2/g$ (ASTM D 3765) and a pore volume of about 0.7 to about 1.7 ml/g (DIN 66133) may be used. Hence VN3 (by Degussa AG, Germany) is an example of a silicic acid that can be used. The proportion of silicic acid in the rubber mixture is advantageously up to about 110 phr, preferably about 15 to about 60 phr. Carbon black CRX 2000 by Cabot Corporation of Billerica, USA is an example of a carbon black whose surface has silanol groups. This filler likewise can advantageously be included in the rubber composition at concentrations of up to about 110 phr. Moreover, in addition to active fillers (carbon black and silicic acid), it is also possible to bind to the gel, and thus also to the rubber matrix, inactive fillers through which can be observed a nearly continual change in the property makeup of the rubber composition with the degree of filling. Thus, the rubber composition may contain a filler having nucleophilic groups, e.g., $Al(OH)_3$, minerals, such as kaolin, mica or other silicates. Different nucleophilic groups on the filler would also be conceivable. In principle, it is also possible to mix several such fillers into one rubber mixture, e.g., to combine with other fillers as well.

It is especially advantageous when the rubber composition contains about 10 to about 110 phr gel and about 10 to about 110 phr silicic acid relative to 100 parts of total rubber material.

A strong link is achieved through the reaction of $R_2$ of the coupling agent with the nucleophilic groups of the filler during formation of a chemical bond. Thus, a stable system between the gel and, for example, silicic acid arises due to the coupling agent.

The quantity of coupling agent added depends on the number of electrophilic centers on the gel, so that approximately 25 to 100% of the number of the filler's nucleophilic groups enter into a chemical bond with the coupling agent.

Preferred examples for a coupling agent include substances such as aminopropyltriethoxysilane and 3-(2-aminoethylamino)-propyl-trimethoxysilane.

When aminopropyltriethoxysilane (a coupling agent) is added to a rubber composition comprising silicic acid and a gel whose surface has p-chloromethyl styrene groups, the following reaction, as illustrated below, takes place:

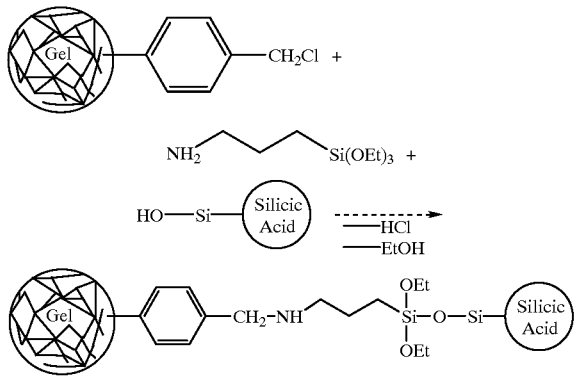

The strong bond between gel and filler makes it possible for the following network to be formed in the composition because of the number of reactive centers in the gel and the silicic acid:

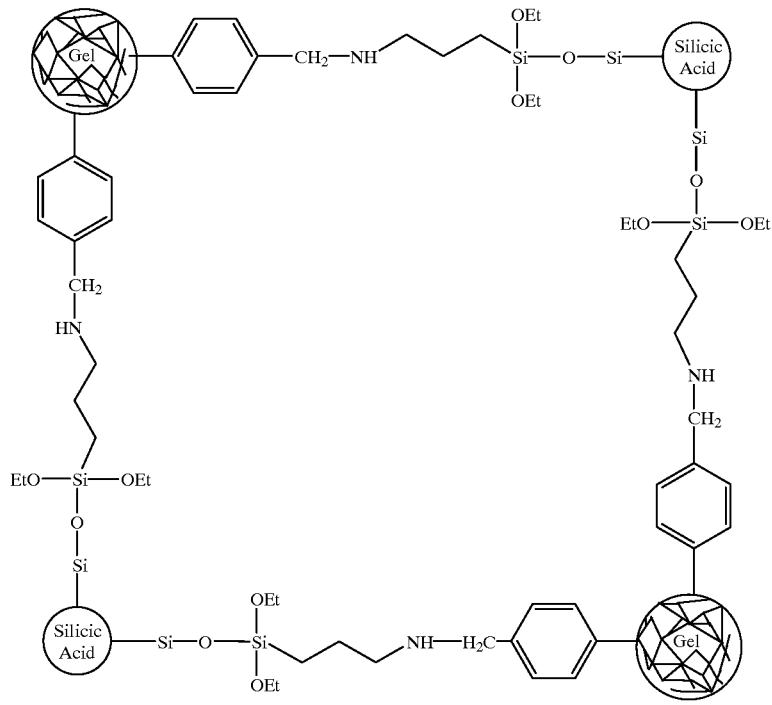

Moreover, the rubber composition according to the present invention may contain customary additives such as anti-aging agents, processing aids and softeners. An example of an anti-aging agent is 6PPD, i.e., N-(1,3-dimethylbutyl)-N'-phenyl-p-phenylenediamine or DTPD, i.e., N'N-diaryl-paraphenylenediamine. Examples of processing aid are stearic acid, waxes, fats, and dispersing agents. An example of a softener is phthalic acid. The customary additives also include additional fillers whose surfaces have no nucleophilic groups. An example is conventional carbon blacks which are known in the art. The carbon blacks can have the following characteristics: DBP number (ASTM D 2414) about 90 to about 200 $cm^3/100$ g and CTAB number (ASTM D 3765) between about 35 and about 220 $m^2/g$. In addition, the rubber composition may also contain a certain percentage of non-cross-linked gels or gels that do not have the appropriate characteristics, which may result from their process of manufacturing. However, the percentage of these gels should be kept as low as possible to avoid adversely affecting the properties of the vulcanizate.

To further improve the physical properties of the rubber composition, it is advantageous that the rubber composition includes a binding substance that facilitates binding of the filler having nucleophilic groups to the polymer matrix. For example, if the filler having nucleophilic groups is silicic acid, bis-3-(triethoxysilylpropyl)tetrasulfide) (TESPT) or the corresponding disulfide has proven effective as a binding substance.

For vulcanization of the rubber composition, sulfur or sulfur sources (e.g., DTDM-dimorpholyldisulfide) can be used. However, it is also possible to allow vulcanization to take place with the aid of different vulcanizing agents such as peroxides, resins, or radiation. Moreover, substances that influence vulcanization, such as accelerators or activators for the relevant type of vulcanization may be added to the rubber composition. For example, sulfur vulcanization can be carried out with CBS:benzothiazyl-2-cyclohexylsulfenamide, TMTD:tetramethylthiuram disulfide, or TBBS:benzothiazyl-2-tert.-butylsulfenamide), by adding any of these vulcanization agents to the rubber composition.

The rubber composition according to the present invention may also contain as a rubber component at least one polymer, preferably selected from natural rubber or cispolyisoprene with a cis-1,4 content>about 90 mole % or styrene butadiene copolymer or polybutadiene or mixtures thereof.

Polyisoprene can be obtained through stereospecific polymerization in solution with Ziegler-Natta catalysts (e.g., $TiCl_4/Al(alkyl)_3$) or with the use of finely divided lithium alkyls (e.g., n-butyllithium). Preferred styrene butadiene copolymers are those containing styrene incorporated by polymerization between about 18 and about 60, preferably between about 20 and about 50 percent by weight. Suspension polymerizates or emulsion polymerizates are preferred. Moreover, polybutadiene should preferably be used for the rubber composition of the present invention; the procedure used to produce the polybutadiene is irrelevant.

Moreover, the rubber composition according to the present invention may contain one or more rubber components known in the art. For example, the rubber component may be selected from butyl rubber (ICR), acrylonitrile butadiene copolymer (NBR), hydrated acrylonitrile butadiene copolymer (HNBR), ethylene propylene copolymer (EPM), ethylene propylene diene terpolymer (EPDM), an isobutylene polymer modified with p-bromomethyl styrene or mixtures thereof.

Manufacture of the rubber composition of this invention may be achieved in a variety of ways. In an initial mixing stage, gel, one or more rubber components and, if applicable, additional customary additives may be placed in the mixing unit to form a master batch. In a second mixing stage, filler having nucleophilic groups, a coupling agent, and, if applicable, additional customary additives, may be added to the base mixture. However, it is also possible to switch the order in which the gel, the filler having nucleophilic groups, and the coupling agent are added. After preparation of the base mixture, and after any intermediate resting period, the vulcanization constituents may be added to the base mixture, thus preparing the final mixture. After a blank is formed, it is subjected to vulcanization.

As already mentioned, the rubber composition according to the present invention can be used for the manufacture of rubber articles subject to stress, including, for example, reinforcement layers, pneumatic springs, conveyor belts, drive belts and the like.

It is especially advantageous for the rubber composition according to the present invention to be used for the manufacture of components for pneumatic tires, and even more specifically, vehicle tires. For example, sidewalls, reinforcement layers, and the like can be manufactured from the rubber composition. It is further advantageous for the tread of a vehicle tire, more particularly pneumatic tires for vehicles, to be made from the rubber composition according to the present invention, where the tread can be made in one or more pieces, such as the cap and base construction. Especially when the rubber composition is used for the tread portion that comes in contact with the roadway, i.e., the cap of the tire, the rubber composition according to the present invention has an additional favorable effect on the rolling resistance. Otherwise the vehicle tires have a conventional structure with regard to design and mixture composition.

EXAMPLES

The invention is described in greater detail using the following exemplary embodiment:

Example 1

Gel A

Lipolan 4046 is a carboxylated SBR latex from Polymer Latex GmbH of Germany. It contains 40 percent styrene by weight, is carboxylated with 2 percent by weight acrylic acid, and has a solids content of 53 percent by weight. The gel content of the latex is 95.9 percent by weight. The swelling index of the gel portion is 7.7% (wet weight/dry weight in toluene). The latex particles have a diameter (ultracentrifuge) of $d_{10}=110$ nm, $d_{50}=192$ nm and $d_{80}=212$ nm. The density of the latex particles is 0.9744 g/cm³. The glass temperature of the SBR is −33.5° C.

For subsequent cross-linking with dicumyl peroxide (DCP), the latex is diluted to a solids concentration of 30 percent by weight and placed in an autoclave. DCP is added in solid form at room temperature (1 phr relative to solid product). By heating the latex to 60° C., the DCP is melted and distributed well into the latex by stirring. To remove oxygen, the reactor contents are evacuated at 60° C. while stirring and pressurized with nitrogen. The evacuation/nitrogen pressurization cycle is repeated 3 times. Then the reactor is heated to 150° C. To avoid latex bake-on during heating, care is taken that the difference between the jacket temperature and interior temperature should not exceed 10° C. After heating, the internal temperature is maintained at a minimum of 150° C. for 45 minutes. Then the gel obtained is cooled and filtered through a Monodur filtration fabric.

As a result of the cross-linking with DCP, the glass temperature is caused to increase to −26.5° C. The particle size is essentially unaffected by the subsequent cross-linkage.

In order to ensure good distribution of the gels in the later rubber matrix, the gel latex is processed with NR into an NR master batch, according to which an NR/gel weight ratio of 50/50 is set.

Taytex, having a solids concentration of 61 percent by weight (importer: Theodor Durrieu, Hamburg, Germany), is used as the NR master batch component.

Before the gel is mixed with the NR latex, the latter is diluted by the addition of 5 percent by weight—relative to the weight of the NR latex—with a 5% Dresinate 731 solution, which is the sodium salt of disproportionated abietic acid made by the Hercules company, Wilmington, United States of America. Then the NR latex is mixed with the gel for 10 minutes under intensive stirring at room temperature.

After manufacture of the NR latex/gel mixture, an anti-aging dispersion is added. For this purpose, a 10% aqueous solution of an aminic anti-aging agent is used. To stabilize 1 kg solid product, 50 g of a dispersion of Vulkanox (N-isopropyl-N-phenyl-p-phenylene-diamine, made by Bayer AG, Germany), 0.0913 g NaOH and 0.45 g emulsifier T11 (partially hydrated stearic acid made by Proctor & Gamble, Cincinnati, United States of America) and 0.193 g Oulu GP 331 (unmodified resinic acid, made by Veitsiluto, Oulo, Finland) are used.

For coagulation, the stabilized NR latex/gel mixture is stirred into an electrolyte solution that has been heated to 60° C. The electrolyte solution contains 10 l water, 75 g common salt, 13.6 g hydrated aluminum sulfate, i.e., $Al_2(SO_4)_3 \cdot 18H_2O$, 1.5 g gelatine and is used to coagulate 1 kg solid product (NR latex/gel mixture). During coagulation, the pH value is maintained at pH=4.0 with 10% sulfuric acid.

The product is filtered off and washed with approximately 40 l Lewatit water and dried at 70° C. in a vacuum shelf dryer. Gel A/NR master batch is thus obtained.

Example 2

Gel B

Gel B is produced from SBR latex Baystal 1357/4 from Polymer Latex GmbH, Germany (formerly Bayer France, Port Jérôme) by subsequent cross-linking with 1.5 phr dicumyl peroxide and by grafting with 5 phr chloromethyl styrene. The gel is isolated in pure form, i.e., without using the master batch technique.

Baystal 1357/4 is a noncarboxylated SBR latex with a styrene content of 22 percent by weight and a solids content of 38 percent by weight. The gel content of the latex is 75 percent by weight and the swelling index of the gelled portion is 61 (wet weight/dry weight in toluene). The latex particles have a diameter of $d_{10}=50$ nm, $d_{50}=56$ nm and $d_{80}=60$ nm. The density of the latex particles is 0.9281 g/cm$^3$. The glass temperature of the SBR is −57° C.

The particle size of the gel is essentially unaffected by the subsequent cross-linking with DCP; the gel content increases to 97.5 percent by weight and the density increases to 0.9717 g/cm$^3$; the swelling index decreases by 5.4% and the glass temperature increases to −26.5° C.

After cross-linking, the gel is grafted with 5 phr chloromethyl styrene. To this end, the gel is restabilized with the Na salt of an alkylsulfonate (Mersolat K 30 made by Bayer AG, Germany) (0.75% relative to gel solids) and diluted with water to a solids concentration of 22%. At room temperature, 5 phr chloromethyl styrene (Dow Chemical, Stade, Germany) relative to gel solids and 0.2% relative to gel solids of 50% p-menthane hydroperoxide (Triganox NT50 made by Akzo Nobel, Arnheim, Netherlands) are added to a 13.4% (0.09% relative to gel solids) aqueous solution of the Na salt of 1-hydroxymethane sulfinic acid dihydrate (Rongalit, BASF AG, Germany), and are heated to 70° C. while stirring. The internal temperature is maintained at 70° C. until a final solids content corresponding to a 100% polymerization reaction is achieved (approximately 1 hour). During the reaction, the pH of the reaction mixture is kept at 10 by adding drops of a 1 N aqueous solution of sodium hydroxide.

Prior to isolation of the gel, it is treated with a dispersion of phenolic anti-aging agent, where 1.3 g of the dispersion (0.65 percent by weight relative to latex solids) are used for 100 g latex solids. The stabilizer dispersion contains 10.8 parts by weight Lewatit water and 1.2 parts by weight NP 10 emulsifier (ethoxylated nonylphenol made by Bayer AG, Germany), 1 part by weight Vulkanox ZKF (2,2-methylene-bis-(4-methyl-6-cyclohexylphenol), made by Bayer AG, Germany), 4 parts by weight Vulkanox KB (2,6-di-t-butyl-4-methylphenol, made by Bayer AG, Germany), 7 parts by weight Irganox PS 800 (made by Ciba Geigy, Switzerland), and is produced through Ultraturrax dispersion of the anti-aging agent mixture in the aqueous NP 10 solution that has been heated to 95° C.

To isolate 100 g of gel B, the gel to which the anti-aging agent has been added is stirred into a precipitating bath that has been heated to 65° C. The bath comprises: 1245 g Lewatit water, 46.8 g common salt, and 25 g 1% precipitating agent (Superfloc C 567 Flocculant, Cytec Industries, United States of America). The pH is adjusted to 4 with 10% sulfuric acid. During coagulation, the bath is maintained at pH 4.0±0.5 by adding more 10% sulfuric acid. The coagulated product is washed twice for 30 minutes at 65° C., where the amount of water used each time is 5 times the amount of rubber. After drying, the gel B is obtained.

After grafting, the chlorine content, which is determined through elementary analysis, is 0.4 percent by weight. Grafting does not affect the level of the glass temperature.

Example 3

Gel C

Gel C is produced from SBR latex Baystal 1357 (made by Polymer Latex GmbH, Germany) by subsequent cross-linking with 1.5 phr dicumyl peroxide and subsequent grafting with 10 phr chloromethyl styrene. Prior to grafting, the colloid stability of the gel is improved by adding 1.5 percent by weight of Mersolat K 30 (made by Bayer AG, Germany). The activation of polymerization is carried out with 0.4 percent by weight of Triganox NT50 (made by Akzo Nobel, Arnheim, Netherlands) and 0.18 percent by weight of Rongalit (made by BASF, Germany). The polymer gel is stabilized and isolated from the latex in pure form, i.e., without using the master batch technique, as described for gel B.

After grafting, the gel C contains 1 percent by weight chlorine and has a gel content of 98 percent by weight, a swelling index of 3.8 and a glass temperature of −24° C.

Example 4

Gel D

Gel D is produced from an SBR latex with 39 percent by weight styrene (Bayer AG, Leverkusen, Germany), $d_{10}=108$ nm; $d_{50}=125$ nm; $d_{80}=135$ nm; gel content: 95.5 percent by weight; swelling index: 13.5; glass temperature: −34° C. through subsequent cross-linkage with 1.2 phr dicumyl peroxide and through grafting with 3 phr chloromethyl styrene. The pre-cross-linked and modified latex is stabilized as described for gel A, and can be processed as a 50% NR master batch.

In Table 1 below, a rubber mixture is produced in the conventional way, where the gel B is used as filler:

TABLE 1

|  | Reference-State of the Art [phr] | Reference [phr] | Compositions According to the Present Invention [phr] |
|---|---|---|---|
| Constituents | 1 | 2 | 3 |
| natural rubber | 100 | 100 | 100 |
| gel B | — | 30 | 30 |
| silicic acid VN3** | 50 | 20 | 20 |
| silane Si 69** | 4 | 1.6 | 1.6 |
| aminopropyl-triethoxysilane | — | — | 0.55* |
| anti-aging agent 6PPD | 1 | 1 | 1 |
| zinc oxide | 3 | 3 | 3 |
| stearic acid | 2 | 2 | 2 |
| sulfur | 1.65 | 1.65 | 1.65 |
| accelerant TBBS | 1 | 1 | 1 |
| accelerant DPG | 1 | 1 | 1 |

*(i.e., approximately 25% of the number of electrophilic centers of the gel enter into a bond with the coupling agent)
**Degussa AG, Germany The unit phr relates to 100 parts of the weight of the total rubber components.

The rubber mixture is vulcanized at 150° C. for 30 minutes.

TABLE 2

|  | Reference - State of the Art | Reference | Compositions According to the Present Invention |
|---|---|---|---|
| Properties | 1 | 2 | 3 |
| tensile strength [MPa] DIN 53504 | 22.2 | 19.8 | 21 |
| tensile modulus | 1.42 | 1.98 | 2.1 |

TABLE 2-continued

|  | Reference - State of the Art | Reference | Compositions According to the Present Invention |
|---|---|---|---|
| 100% [MPa] DIN 53504 tensile modulus 300% [MPa] DIN 53504 | 7.24 | 9.3 | 10.19 |
| hardness [Shore A] DIN 53505 | 57 | 57 | 58 |
| rebound resilience [%] 23° C. DIN 53512 | 54 | 56 | 57 |
| rebound resilience [%] 70° C. DIN 53512 | 60 | 69 | 71 |

It can be seen from Table 2 that the rebound resilience values at 70° C. are increased significantly in compositions 2 and 3 as compared to composition 1, with the rebound resilience values at 23° C. remaining at the same level, thus showing an improvement in hysteresis behavior. At the same time, higher tensile modulus values are measured in the composition 3 according to the present invention. This characteristic provides information on the stiffness of the vulcanized product, and also on the durability. When this rubber composition (composition 3) is used to manufacture treads for vehicle tires, this means increased stiffness, for instance, of the tread pattern block flanks, which leads to better traction. The values for rebound resilience indicate that the composition according to the present invention has reduced rolling resistance (increased rebound resilience values at 70° C.) with unchanged wet skid behavior (rebound resilience values at 23° C.). Thus, pneumatic tires for vehicles may be prepared whose damping characteristics are optimized and whose traction and durability are improved.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A composition comprising a rubber mixture that can be vulcanized with a vulcanizing agent, which comprises
   a) at least one rubber component,
   b) at least one filler having nucleophilic groups,
   c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers,
   d) a substance acting as a coupling agent between the filler having nucleophilic groups and the additional filler, the substance acting as a coupling agent having the following structure:

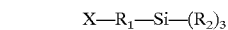

wherein
   X is a nucleophilic group,
   $R_1$ is an alkyl group having up to about 6 carbon atoms or a phenyl group, and
   $R_2$ may be the same as or different from each other and from $R_1$ and is an alkyl or alkoxy group having up to 6 carbon atoms and at least one of $R_2$ is an alkoxy group.

2. The composition according to claim 1 wherein X is $NH_2$, SH, or $NHR_3$, wherein $R_3$ is an alkyl group having up to about 3 carbon atoms or a phenyl group.

3. The composition according to claim 1 wherein the alkyl group of $R_2$ or $R_2$ is branched, unbranched or cyclic.

4. The composition according to claim 1 wherein the substance acting as a coupling agent is aminopropyltriethoxysilane or 3-(2-aminoethylamino)-propyl-trimethoxysilane.

5. The composition according to claim 1 wherein the nucleophilic groups of the filler are silanol groups.

6. The composition according to claim 5 wherein the filler with the silanol groups is silica.

7. The composition according to claim 1 wherein the filler is carbon black having silanol groups located on its surface.

8. The composition according to claim 1 wherein the rubber component is selected from natural rubber, synthetic polyisoprene, styrene butadiene, polybutadiene, or mixtures thereof.

9. The composition according to claim 1 wherein about 10 to about 110 phr gel and about 10 to about 110 phr silicic acid relative to 100 parts of total rubber material are present in the composition.

10. The composition according to claim 1 wherein, based upon 100 parts by weight of the rubber component, the filler having nucleophilic groups is present in a range of from about 10 phr to about 110 phr, the gel particles having electophilic centers are present in a range of from about 10 phr to about 110 phr, and the substance acting as a coupling agent is present in a range of from about 10 mole % to about 100 mole % with respect to the molar amount of the electrophilic centers of the gel particles.

11. The composition according to claim 10 wherein, based upon 100 parts by weight of the rubber component, the filler having nucleophilic groups is present in a range of from about 15 phr to about 60 phr, the gel particles having electophilic centers are present in a range of from about 15 phr to about 60 phr, and the substance acting as a coupling agent is present in a range of from about 10 mole % to about 50 mole % with respect to the molar amount of the electrophilic centers of the gel particles.

12. The composition according to claim 11 wherein, based upon 100 parts by weight of the rubber component, the filler having nucleophilic groups is present in a range of from about 20 phr to about 40 phr, the gel particles having electophilic centers are present in a range of from about 20 phr to about 40 phr, and the substance acting as a coupling agent is present in a range of from about 15 mole % to about 35 mole % with respect to the molar amount of the electrophilic centers of the gel particles.

13. The composition according to claim 1 wherein the gel is selected from a polymer of butadiene with p-chloromethyl styrene, a polymer of styrene butadiene rubber modified with p-chloromethyl styrene, and a polymer of butadiene with methacrylic methylester, wherein each polymer has a swelling index in toluene between about 1 and about 15 and a particle size between about $3 \times 10^{-9}$ and about $1 \times 10^{-6}$ m.

14. The composition according to claim 1 wherein the gel is styrene butadiene rubber modified with p-chloromethyl styrene with a swelling index in toluene between about 1 and about 15 and a particle size between about $3 \times 10^{-9}$ and about $1 \times 10^{-6}$ m.

15. A rubber article subject to stress which is selected from a pneumatic spring, a conveyor belt, a drive belt, a pneumatic tire, or a vehicle tire comprising the rubber composition of claim 1.

16. The rubber article of claim 15, which is a sidewall, a reinforcement layer or a tread.

17. A vehicle tire comprising a rubber mixture that can be vulcanized with a vulcanizing agent, which comprises
   a) at least one rubber component,
   b) at least one filler having nucleophilic groups,
   c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers,
   d) a substance acting as a coupling agent between the filler having nucleophilic groups and the additional filler, the substance acting as a couple agent having the following structure:

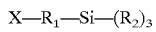

wherein
   X is a nucleophilic group,
   $R_1$ is a branched, unbranched or cyclic alkyl group having up to about 6 carbon atoms or a phenyl group, and
   $R_2$ may be the same as or different from each other and from $R_1$ and is a branched, unbranched or cyclic alkyl or alkoxy group having up to 6 carbon atoms and at least one of $R_2$ is an alkoxy group.

18. The vehicle tire according to claim 17 wherein X is $NH_2$, SH, or $NHR_3$, wherein $R_3$ is an alkyl group having up to about 3 carbon atoms or a phenyl group.

19. The vehicle tire according to claim 17 wherein the substance acting as a coupling agent is aminopropyltriethoxysilane or 3-(2-aminoethylamino)-propyl-trimethoxysilane.

20. The vehicle tire according to claim 17 wherein the nucleophilic groups of the filler are silanol groups.

21. The vehicle tire according to claim 17 wherein the rubber component is selected from natural rubber, synthetic polyisoprene, styrene butadiene, polybutadiene, or mixtures thereof and the gel is selected from a polymer of butadiene with p-chloromethyl styrene, a polymer of styrene butadiene rubber modified with p-chloromethyl styrene, or a polymer of butadiene with methacrylic methylester, wherein each polymer has a swelling index in toluene between about 1 and about 15 and a particle size between about $3 \times 10^{-9}$ and about $1 \times 10^{-6}$ m.

22. The vehicle tire according to claim 17 further comprising a member selected from a tread, a sidewall or a reinforcement layer.

23. A method of formulating a composition, which comprises:
   forming a mixture comprising a filler and at least one rubber component and mixing;
   adding to the mixture gel particles comprising a rubber, having a particle size between about $3 \times 10^{-9}$ and about $1 \times 10^{-6}$ m and a swelling index in toluene of about 1 to about 15 and whose surface has electrophilic centers, and mixing;
   adding to the mixture at least one filler having nucleophilic groups and mixing; and
   adding to the mixture a substance acting as a coupling agent between the filler having nucleophilic groups and the additional filler wherein the substance acting as a coupling agent has the following structure:

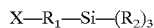

wherein
   X is a nucleophilic group,
   $R_1$ is a branched, unbranched or cyclic alkyl group having up to 6 carbon atoms or a phenyl group, and
   $R_2$ may be the same as or different from each other and from $R_1$ and is a branched, unbranched or cyclic alkyl or alkoxy group having up to 6 carbon atoms and at least one of $R_2$ is an alkoxy group and mixing; thereby forming a base mixture to which vulcanizing constituents are added.

24. The method of formulating a composition according to claim 23 wherein X is $NH_2$, SH, or $NHR_3$, wherein $R_3$ is an alkyl group having up to about 3 carbon atoms or a phenyl group.

25. The method of formulating a composition according to claim 23 wherein the substance acting as a coupling agent is aminopropyltriethoxysilane or 3-(2-aminoethylamino)-propyl-trimethoxysilane.

26. The method of formulating a composition according to claim 23 wherein, based upon 100 parts by weight rubber, the filler having nucleophilic groups is present in a range of from about 10 phr to about 110 phr, the gel particles having electophilic centers are present in a range of from about 10 phr to about 110 phr, and the substance acting as a coupling agent is present in a range of from about 10 mole % to about 100 mole % with respect to the molar amount of the electrophilic centers of the gel particles.

27. The method of formulating a composition according to claim 26 wherein, based upon 100 parts by weight rubber, the filler having nucleophilic groups is present in a range of from about 15 phr to about 60 phr, the gel particles having electophilic centers are present in a range of from about 15 phr to about 60 phr, and the substance acting as a coupling agent is present in a range of from about 10 mole % to about 50 mole % with respect to the molar amount of the electrophilic centers of the gel particles.

28. The method of formulating a composition according to claim 27 wherein, based upon 100 parts by weight rubber, the filler having nucleophilic groups is present in a range of from about 20 phr to about 40 phr, the gel particles having electophilic centers are present in a range of from about 20 phr to about 40 phr, and the substance acting as a coupling agent is present in a range of from about 15 mole % to about 35 mole % with respect to the molar amount of the electrophilic centers of the gel particles.

29. The method of formulating a composition according to claim 23 wherein the nucleophilic groups of the filler are silanol groups, the rubber component is selected from natural rubber, synthetic polyisoprene, styrene butadiene, polybutadiene, or mixtures thereof and the gel is selected from a polymer of butadiene with p-chloromethyl styrene, a polymer of styrene butadiene rubber modified with p-chloromethyl styrene, or a polymer of butadiene with methacrylic methylester, wherein each polymer has a swelling index in toluene between about 1 and about 15 and a particle size between about $3 \times 10^{-9}$ and about $1 \times 10^{-6}$ m.

30. The method of formulating a composition according to claim 23 further comprising adding a vulcanization agent to the base mixture, forming a blank to be vulcanized and vulcanizing the blank, thereby resulting in an article.

31. The method of formulating a composition according to claim 30, wherein the article is a vehicle tire, a pneumatic tire, a tread, a sidewall, a reinforcement layer, a pneumatic spring, a conveyor belt, or a drive belt.

32. A pneumatic tire comprising a rubber mixture that can be vulcanized with a vulcanizing agent, which comprises
   a) at least one rubber component,
   b) at least one filler having nucleophilic groups,
   c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers,
   d) a substance acting as a coupling agent between the filler having nucleophilic groups and the additional filler, the substance acting as a couple agent having the following structure:

$$X\!-\!R_1\!-\!Si\!-\!(R_2)_3$$

wherein
   X is a nucleophilic group,
   $R_1$ is a branched, unbranched or cyclic alkyl group having up to about 6 carbon atoms or a phenyl group, and
   $R_2$ may be the same as or different from each other and from $R_1$ and is a branched, unbranched or cyclic alkyl or alkoxy group having up to 6 carbon atoms and at least one of $R_2$ is an alkoxy group.

33. The pneumatic tire according to claim 32 wherein X is $NH_2$, SH, or $NHR_3$, wherein $R_3$ is an alkyl group having up to about 3 carbon atoms or a phenyl group.

34. The pneumatic tire according to claim 32 wherein the substance acting as a coupling agent is aminopropyltriethoxysilane or 3-(2-aminoethylamino)-propyl-trimethoxysilane.

35. The pneumatic tire according to claim 32 wherein the nucleophilic groups of the filler are silanol groups.

36. The pneumatic tire according to claim 32 wherein the rubber component is selected from natural rubber, synthetic polyisoprene, styrene butadiene, polybutadiene, or mixtures thereof and the gel is selected from a polymer of butadiene with p-chloromethyl styrene, a polymer of styrene butadiene rubber modified with p-chloromethyl styrene, or a polymer of butadiene with methacrylic methylester, wherein each polymer has a swelling index in toluene between about 1 and about 15 and a particle size between about $3 \times 10^{-9}$ and about $1 \times 10^{-6}$ m.

37. The pneumatic tire according to claim 32 wherein, based upon 100 parts by weight of the rubber component, the filler having nucleophilic groups is present in a range of from about 10 phr to about 110 phr, the gel particles having electophilic centers are present in a range of from about 10 phr to about 110 phr, and the substance acting as a coupling agent is present in a range of from about 10 mole % to about 100 mole % with respect to the molar amount of the electrophilic centers of the gel particles.

38. The pneumatic tire according to claim 37 wherein, based upon 100 parts by weight of the rubber component, the filler having nucleophilic groups is present in a range of from about 15 phr to about 60 phr, the gel particles having electophilic centers are present in a range of from about 15 phr to about 60 phr, and the substance acting as a coupling agent is present in a range of from about 10 mole % to about 50 mole % with respect to the molar amount of the electrophilic centers of the gel particles.

39. The pneumatic tire according to claim 38 wherein, based upon 100 parts by weight of the rubber component, the filler having nucleophilic groups is present in a range of from about 20 phr to about 40 phr, the gel particles having electophilic centers are present in a range of from about 20 phr to about 40 phr, and the substance acting as a coupling agent is present in a range of from about 15 mole % to about 35 mole % with respect to the molar amount of the electrophilic centers of the gel particles.

40. A composition comprising a rubber mixture that can be vulcanized with a vulcanizing agent, which comprises
   a) at least one rubber component,
   b) at least one filler having nucleophilic groups,
   c) as an additional filler, gel particles consisting essentially of a rubber, having a particle size between about $3 \times 10^{-9}$ and about $1 \times 10^{-6}$ m and a swelling index in toluene of about 1 to about 15 and whose surface has electrophilic centers,
   d) a substance acting as a coupling agent between the filler having nucleophilic groups and the additional filler, the substance acting as a coupling agent having the following structure:

$$X\!-\!R_1\!-\!Si\!-\!(R_2)_3$$

wherein
   X is a nucleophilic group,
   $R_1$ is an alkyl group having up to about 6 carbon atoms or a phenyl group, and
   $R_2$ may be the same as or different from each other and from $R_1$ and is an alkyl or alkoxy group having up to 6 carbon atoms and at least one of $R_2$ is an alkoxy group.

41. The composition according to claim 40 wherein X is $NH_2$, SH, or $NHR_3$, wherein $R_3$ is an alkyl group having up to about 3 carbon atoms or a phenyl group.

42. The composition according to claim 40 wherein the alkyl group of $R_1$ or $R_2$ is branched, unbranched or cyclic.

43. The composition according to claim 40 wherein the gel is styrene butadiene rubber modified with p-chloromethyl styrene with a swelling index in toluene between about 1 and about 15 and a particle size between about $3 \times 10^{-9}$ and about $1 \times 10^{-6}$ m.

44. The composition according to claim 40 wherein about 10 to about 110 phr gel and about 10 to about 110 phr silicic acid relative to 100 parts of total rubber material are present in the composition.

* * * * *